US009062558B2

(12) United States Patent
Joe et al.

(10) Patent No.: US 9,062,558 B2
(45) Date of Patent: Jun. 23, 2015

(54) BLADE OUTER AIR SEAL HAVING PARTIAL COATING

(75) Inventors: Christopher R. Joe, Wethersfield, CT (US); Paul M. Lutjen, Kennebunkport, MI (US); Dominic J. Mongillo, Jr., West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 830 days.

(21) Appl. No.: 13/183,891

(22) Filed: Jul. 15, 2011

(65) Prior Publication Data
US 2013/0017058 A1    Jan. 17, 2013

(51) Int. Cl.
*F01D 11/08* (2006.01)

(52) U.S. Cl.
CPC ............ *F01D 11/08* (2013.01); *F05D 2230/90* (2013.01); *F05D 2250/292* (2013.01); *F05D 2260/202* (2013.01); *Y02T 50/676* (2013.01)

(58) Field of Classification Search
USPC ............. 415/127, 168.4, 175, 176, 115, 116, 415/173.1, 173.4, 174.4, 196, 197, 200
See application file for complete search history.

(56) References Cited

U.S. PATENT DOCUMENTS

| | | | | |
|---|---|---|---|---|
| 4,337,016 A * | 6/1982 | Chaplin | ......................... | 415/116 |
| 4,422,648 A * | 12/1983 | Eaton et al. | ....................... | 277/415 |
| 4,497,610 A * | 2/1985 | Richardson et al. | ........... | 415/116 |
| 4,551,064 A * | 11/1985 | Pask | ............................... | 415/116 |
| 5,165,847 A * | 11/1992 | Proctor et al. | .................. | 415/115 |
| 5,282,718 A * | 2/1994 | Koff et al. | ....................... | 415/57.3 |
| 5,308,225 A * | 5/1994 | Koff et al. | ....................... | 415/57.3 |
| 5,439,348 A | 8/1995 | Hughes et al. | | |
| 6,196,792 B1 | 3/2001 | Lee et al. | | |
| 6,264,425 B1 * | 7/2001 | Keller | ........................... | 415/58.7 |
| 6,670,046 B1 | 12/2003 | Xia | | |
| 6,726,448 B2 * | 4/2004 | McGrath et al. | ........... | 415/173.3 |
| 6,887,529 B2 | 5/2005 | Borneman et al. | | |
| 6,905,302 B2 * | 6/2005 | Lee et al. | ........................ | 415/115 |
| 7,008,183 B2 * | 3/2006 | Sayegh et al. | ............... | 415/173.1 |
| 7,306,424 B2 | 12/2007 | Romanov et al. | | |
| 7,726,936 B2 * | 6/2010 | Keller et al. | ................. | 415/173.4 |
| 2009/0067994 A1 | 3/2009 | Pietraszkiewicz | | |
| 2009/0110536 A1 | 4/2009 | Strock et al. | | |
| 2009/0226300 A1 | 9/2009 | Knapp et al. | | |
| 2010/0104426 A1 | 4/2010 | Keller | | |

FOREIGN PATENT DOCUMENTS

DE          19619438          11/1997

OTHER PUBLICATIONS

EP Search Report for European Patent Application No. 12175296.8 completed on Jul. 8, 2014.

* cited by examiner

*Primary Examiner* — Dwayne J White
*Assistant Examiner* — Justin Seabe
(74) *Attorney, Agent, or Firm* — Carlson, Gaskey & Olds, P.C.

(57) ABSTRACT

A blade outer air seal member includes a body that extends between two circumferential sides, axially between a leading edge and a trailing edge, and between a gas path side and a radially outer side opposite the gas path side. A ceramic coating is initially disposed on a portion of the gas path side outside of a blade rub area of the gas path side such that the blade rub area is bare with regard to any ceramic coating.

10 Claims, 2 Drawing Sheets

BLADE OUTER AIR SEAL HAVING PARTIAL COATING

STATEMENT REGARDING FEDERALLY SPONSORED RESEARCH OR DEVELOPMENT

This invention was made with government support under contract numbers F33615-95-C-2503 and F33615-97-C-2779 awarded by the United States Air Force. The government has certain rights in the invention.

BACKGROUND

This disclosure relates to seals and, more particularly, to a blade outer air seal member for a gas turbine engine.

Conventional gas turbine engines are widely known and used as ground-based turbines for energy production or for propelling aircraft or other vehicles. Typically, a gas turbine engine includes a compressor section, a combustor section, and a turbine section that cooperate in the combustion of fuel to expand combustion gases over the turbine section in a known manner.

A blade outer air seal is located radially outwards from the turbine section and functions as an outer wall for the hot gas flow through the turbine section. Due to large pressures and the contact with the hot gas flow, the blade outer air seal is made of a strong, oxidation-resistant metal alloy and requires a cooling system to keep the alloy below a certain temperature. For example, relatively cool air is taken from an air flow through the engine (e.g., compressor) and routed through an intricate system of cooling passages in the seal to maintain a desirable seal temperature. The gas path surface of the blade outer air seal may include a thermal, environmental or corrosion resistance coating system to help protect the underlying metal alloy.

SUMMARY

Disclosed is a blade outer air seal member that includes a body that extends between two circumferential sides, axially between a leading edge and a trailing edge, and between a gas path side and a radially outer side opposite the gas path side. A ceramic coating is initially disposed on a portion of the gas path side outside of a blade rub area of the gas path side such that the blade rub area is bare with regard to any ceramic coating.

In another aspect, the blade outer air seal member also includes a cooling passage that has an outlet hole that opens at the bare area. The cooling passage extends in the body in an axial direction such that a portion of the cooling passage is adjacent the ceramic coating.

Also disclosed is a method for enhancing durability of a blade outer air seal member. The method includes establishing a greater amount of cooling to the blade rub area of the gas path side than to the portion that is coated.

The various features and advantages of the disclosed examples will become apparent to those skilled in the art from the following detailed description. The drawings that accompany the detailed description can be briefly described as follows.

DETAILED DESCRIPTION

Figure 1:
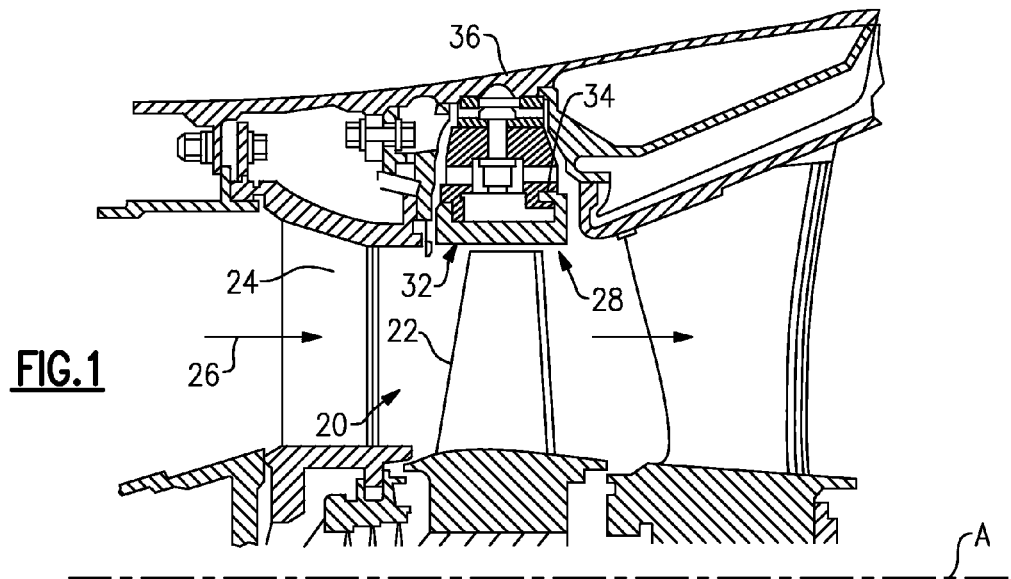
FIG. 1 illustrates an example turbine section.

FIG. 1 illustrates a selected portion of a turbine section 20 of a gas turbine engine. The gas turbine engine is of known arrangement and includes a compressor section, a combustion section and the turbine section 20. The turbine section 20 includes turbine blades 22 and turbine vanes 24.

The turbine blades 22 receive a hot gas flow 26 from the combustion section of the engine. The turbine section 20 includes a blade outer air seal system 28 having a blade outer air seal member 32 that functions as an outer wall for the hot gas flow 26 through the turbine section 20. In the disclosed example, the blade outer air seal member 32 is removably secured to a support 34 using L-shaped hooks or other attachment features. The support 34 is secured to a case 36 that generally surrounds the turbine section 20. The turbine section 20 is provided with a plurality of blade outer air seal members 32, or segments, that are circumferentially arranged about the turbine blades 22. The features of the blade outer air seal member 32 that will be described below with regard to the normal orientation of the blade outer air seal member 32 in the engine relative to a central axis A of the engine.

FIG. 1 is a schematic presentation to illustrate an example operating environment of the blade outer air seal member 32 and is not a limitation on the disclosed examples. Additionally, there are various types of gas turbine engines, many of which could benefit from the examples disclosed herein.

Figure 2:
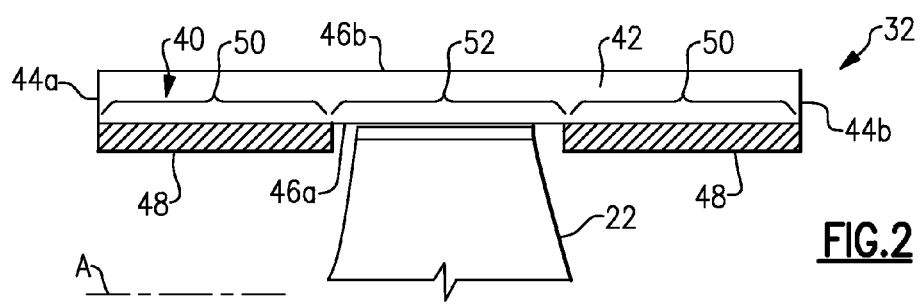
FIG. 2 illustrates an example blade outer air seal member having a partial ceramic coating.

FIG. 2 illustrates an example of the blade outer air seal member 32. In the illustration, the blade outer air seal member 32 is shown in a simplified view, without connection features or cooling passages that may be included. In this example, the blade outer air seal member 32 includes a body 40 that extends between two circumferential sides 42 (one shown), axially between a leading edge 44a and a trailing edge 44b, between a gas path side 46a and a radially outer side 46b opposite the gas path side 46a.

A coating 48 is initially disposed on a portion 50 of the gas path side 46a. The portion 50 is outside of a blade rub area 52 (i.e., surface) of the gas path side 46a. The blade rub area 52 is initially bare with regard to any of the coating 48. The blade rub area 52 optionally includes another type of types of non-ceramic or non-thermal barrier coatings (e.g., MCrAlY), but does not include a ceramic coating. That is, the blade rub area 52 is bare with, regard to any ceramic coating, prior to any contact with the tips of the blades 22 and is not bare from abrasion contact with the blades 22. For example, the blade rub area 52 is directly outboard of the tips of the blades 22 and rubs against the tips during a wear-in period of the blade outer air seal member 32. After the wear-in period, there is reduced or no contact between the tips and the blade rub area 52.

In the illustrated example, the coated portion 50 of the gas path side 46a includes a first area (to the left of the blade rub area 53 in the illustration) that extends along the leading edge 44a and a second area (to the right of the blade rub area 53 in the illustration) that extends along the trailing edge 44b. The blade rub area 52 separates the first area from the second area, although in other examples the portion 50 need not be divided. In a further example, the blade rub area 52 bisects the coated portion 50 such that the size of the first area is approximately equivalent to the size of the second area. It is to be understood that in other examples, the sizes of the first area and the second area need not be equal and the sizes may depend upon the particular design of the turbine section 20.

Figure 3:
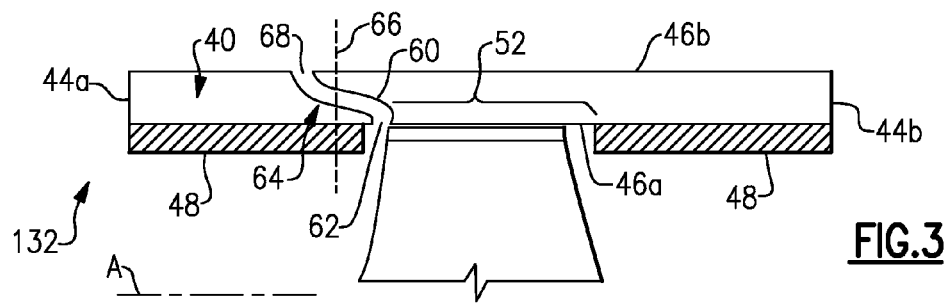
FIG. 3 illustrates another example blade outer air seal member having a partial ceramic coating and a cooling passage that extends under the coating.

FIG. 3 illustrates another example blade outer air seal member 132. In this disclosure, like reference numerals designate like elements where appropriate and reference numerals with the addition of one-hundred or multiples thereof designate modified elements. The modified elements are understood to incorporate the same features and benefits of the corresponding elements. In this example, the blade outer air seal member 132 is similar to the blade outer air seal member 32 shown in FIG. 2, but additionally includes a cooling passage 60 that extends within the body 40. The blade outer air seal member 132 may include multiple of such cooling passages 60. The cooling passage 60 has an outlet hole 62 that opens at the blade rub area 52. The cooling passage 60 extends in the body 40 in an axial direction relative to engine axis A such that a portion 64 of the cooling passage 60 is adjacent to the coating 48. In a further example, the portion 64 of the cooling passage 60 is axially aligned (i.e., at the same axial position), as represented at 66, with a part of the coating 48. That is, the cooling passage 60 in this example extends forward from the outlet hole 62 toward the leading edge 44a and underneath a portion of the coating 48. In this example, the cooling passage 60 has an inlet hole 68 on the radially outer side 46b of the blade outer air seal member 132.

In operation, the tips of the blades 22 extend into contact with the blade rub area 52 of the body 40. During the wear-in period, the tips rub against the blade rub area 52, or at least a portion thereof. After the wear-in period, the blade rub area 52 is exposed to high temperature combustion gases.

In use, the cooling fluid flowing through the cooling passage 60 enters through inlet hole 68 and travels through the portion 64 to the outlet hole 62. The cooling fluid that exits the outlet hole 62 provides a film of cooling fluid over the blade rub area 52 to help maintain the blade rub area 52 at a desired temperature. The routing of the cooling passage 60 under and adjacent the coating 48 also helps to maintain the coated portions 50 in the first area at a desirable temperature. Thus, the cooling passage 60 serves the dual purpose of helping to cool the coated areas as well as film cooling the blade rub area 52. The disclosed cooling passage 60 may therefore reduce the need for other cooling to the coated portions 50. For example, the coated portions 50 may be cooled through the use of film cooling holes that are located on the leading edge 44a (not shown).

With cycling of the engine between on and off conditions, or even between throttle levels, different amounts of heat are generated. The repeated heating and relative cooling of the blade rub area 52 causes the body 40 at the blade rub area 52 to thermally expand and contract. The cooling passage 60 is provided to maintain the blade rub area 52 at a desired temperature to reduce the effects of thermal expansion and contraction.

In comparison, a blade outer air seal member having a gas path side that is entirely coated with a ceramic thermal barrier coating is subject to wear against the tips of the blades during a wear-in period. The tips wear or spall away the ceramic coating in the blade rub area. With continued use, the ceramic coating can spall and expose the underlying bare metal to the high temperature combustion gases. With local exposure of the central portion of the BOAS, excessive temperatures and stresses can lead to early degradation of the segment. In areas outside of the blade rub area, less heat is generated. The difference in heat generation between the blade rub area and areas outside of the blade rub area cause thermal stress in the axial direction of the blade outer air seal member. The thermal stresses can cause cracking in the coating and/or in the underlying metal of the body. However, in the disclosed example where sufficient cooling is provided to the blade rub area 52 to account for there not being any of the coating 48, the heat from the high temperature combustion gases can be adequately removed to limit the effects of thermal expansion and contraction.

Figure 4:
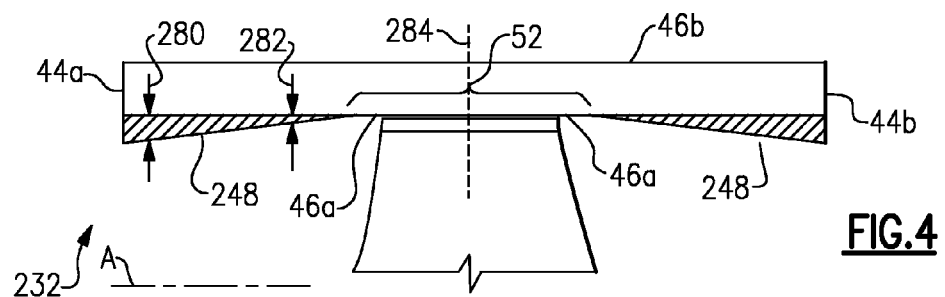
FIG. 4 illustrates another example blade outer air seal member that has a tapered ceramic coating.

FIG. 4 illustrates another embodiment blade outer air seal member 232. In this example, the blade outer air seal member 232 is similar to the blade outer air seal member 32 shown in FIG. 2, in which the coating 48 has a uniform thickness throughout. However, in this example, the blade outer air seal member 232 includes a coating 248 that tapers axially. As shown, the coating 248 is thicker at a first location 280 than at a second location 282 that is closer to an axial center 284 of the blade outer air seal member 232. For instance, the coating 248 is thickest at the leading edge 44a, the trailing edge 44b, or both and reduces in thickness as a function of distance from the axial center 284.

In the illustrated example, the coating 248 on the first area (to the left of the blade rub area 52 in the illustration) of the gas path side 46a tapers from the leading edge 44a to a zero thickness at a terminal edge of the coating along the blade rub area 52. Likewise, the coating 248 on the second area (to the right of the blade rub area 52 in the illustration) of the gas path side 46a tapers in thickness from the trailing edge 44b toward a zero thickness at a terminal edge of the coating 248 along the blade rub area 52. In a further example, the coating 284 tapers only over a partial axial length of the first area and/or the second area.

In operation, the tapered thickness of the coating 248 helps to reduce thermal mechanical fatigue of the coating 248 due to heat cycling and difference in temperature between the blade rub area 52 and the portions outside of the blade rub area 52 on which the coating 248 is disposed. That is, there is less of the coating 248 material near the blade rub area 52, which is the hottest portion of the blade outer air seal member 232.

Figure 5:
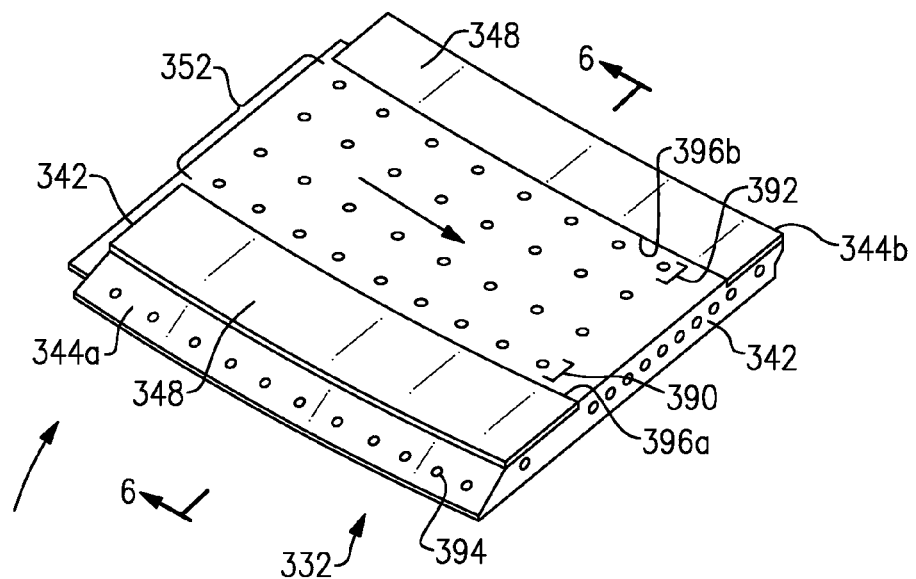
FIG. 5 illustrates an example blade outer air seal member that has a row of circumferential cooling holes.
Figure 6:
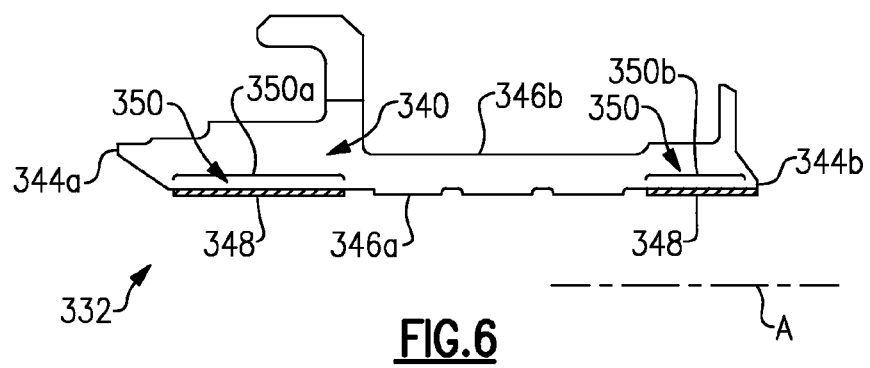
FIG. 6 is a cross-sectional view of the blade outer air seal member of FIG. 5.

FIG. 5 illustrates another example blade outer air seal member 332 in a perspective view and FIG. 6 illustrates the blade outer air seal member 332 in cross-section. In this example, the blade outer air seal member 332 includes a body 340 that extends between two circumferential sides 342, axially between a leading edge 344a and a trailing edge 344b, and between a gas path side 346a and a radially outer side 346b opposite the gas path side 346a.

The blade outer air seal member 332 includes a coating 348 that is disposed on a portion 350 of the gas path side 346a. In this example, part of the coating 348 is disposed on a first area 350a and another part of the coating 348 is disposed on a second area 350b. The areas 350a and 350b are separated by the blade rub area 352 such that the coating 348 is discontinuous on the gas path side 346a.

The blade outer air seal member 332 includes a row 390 of cooling holes that extend adjacent the coating 348 that is located on the leading edge 344a side of the blade outer air seal member 332. The cooling holes can extend under the coating 348, as shown in FIG. 3. As shown, the row 390 is located closer to the coating 348 that is on the first area 350a than to the coating 348 that is on the second area 350b. Optionally, another row 392 of cooling holes may be provided along the coating 348 that is on the second area 350b. However, in some examples, the row 392 is unnecessary because the cooling film emitted from the row 390 flows over the surface of the coating 348 on the second area 350b. The coating 348 on the first area 350a is cooled by cooling holes 394 in the leading edge 344a.

In the illustrated example, the row 390 of cooling holes is adjacent a terminal edge 396a of the coating 348 on the first area 350a. The other row 392 of cooling holes is adjacent a terminal edge 396b of the coating 348 on the second area 350b. For instance, each hole in the row 390 is an equivalent distance from the terminal edge 396a and each hole in the row 392 is an equivalent distance from the terminal edge 396b.

The cooling holes in the blade rub area 352 help to maintain the blade rub area 352 at a desirable temperature. The areas 350a and 350b outside of the blade rub area 352 are thermally protected by the coating 348 and therefore do not require as much cooling as the blade rub area 352. In that regard, the areas 350a and 350b outside of the blade rub area 352 do not include cooling holes. That is, some of the cooling that might otherwise have been used to cool the areas 350a and 350b outside of the blade rub area 352 may instead be used to cool the blade rub area 352 that does not include any coating thereon. Thus, the blade outer area seal member 332 embodies a method of establishing a greater amount of cooling to the bare blade rub area 352 than to the areas 350a and 350b that are coated by providing cooling holes on the blade rub area 352 but not on the coated areas 350a and 350b.

Whereas coatings that are normally used on gas path side surfaces of blade outer air seals must be abradable by having a certain porosity to allow the coating to wear away upon contact with the tips of the blades, the coatings disclosed herein do not contact the tips of the blades. There is therefore no need for the coatings to be abradable with a certain predetermined porosity. Thus, the porosity of the coatings disclosed herein may be reduced to substantially zero if desired, without regard to the abradability with the tips of the blades. Moreover, because the disclosed coatings are not in contact with the tips of the blades and see less heat, the composition of the coatings can be varied from compositions previously used. However, in a few examples, the coating is or includes a ceramic material, such as yttria stabilized zirconia, gadolinia stabilized zirconia, or combinations thereof.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A blade outer air seal member comprising:
    a body that continuously extends between two circumferential sides, axially between a leading edge and a trailing edge, and between a gas path side and a radially outer side opposite the gas path side; and
    a ceramic coating initially disposed on a portion of the gas path side outside of a blade rub area of the gas path side such that the blade rub area is bare with regard to any ceramic coating, wherein the coated portion includes a first area along the leading edge and a second area along the trailing edge, and the blade rub area separates the first area and the second area, the blade rub area including a circumferential row of cooling holes that is located closer to the first area than to the second area, the ceramic coating of both the first area and the second area tapers axially towards an axial center of the body.

2. The blade outer air seal member as recited in claim 1, wherein the coated portion is free of any cooling holes.

3. The blade outer air seal member as recited in claim 1, wherein the gas path side includes a non-ceramic coating.

4. The blade outer air seal member as recited in claim 1, wherein the gas path side includes an MCrAlY coating.

5. The blade outer air seal member as recited in claim 1, wherein the radially outer side includes a hook.

6. The blade outer air seal member as recited in claim 5, wherein the hook is L-shaped.

7. The blade outer air seal member as recited in claim 1, wherein the blade rub area is contiguous with the first area and the second area.

8. A blade outer air seal member comprising:
    a body that continuously extends between two circumferential sides, axially between a leading edge and a trailing edge, and between a gas path side and a radially outer side opposite the gas path side; and
    a ceramic layer initially disposed on a portion of the gas path side outside of a blade rub area of the gas path side such that the blade rub area is bare with regard to any ceramic layer, wherein the ceramic layer includes a first area along the leading edge and a second area along the trailing edge, and the blade rub area separates the first area and the second area, the ceramic layer of both the first area and the second area tapers axially towards an axial center of the body.

9. The blade outer air seal member as recited in claim 8, wherein the blade rub area includes a circumferential row of cooling holes that is located closer to the first area than to the second area.

10. The blade outer air seal member as recited in claim 8, wherein the blade rub area is contiguous with the first area and the second area.

* * * * *